United States Patent
Li et al.

(10) Patent No.: US 9,426,475 B2
(45) Date of Patent: Aug. 23, 2016

(54) SCENE CHANGE DETECTION USING SUM OF VARIANCE AND ESTIMATED PICTURE ENCODING COST

(71) Applicants: Ying Li, Richmond Hill (CA); Xu Gang Zhao, Maple (CA)

(72) Inventors: Ying Li, Richmond Hill (CA); Xu Gang Zhao, Maple (CA)

(73) Assignee: VIXS Sytems Inc., Toronto (CA)

( * ) Notice: Subject to any disclaimer, the term of this patent is extended or adjusted under 35 U.S.C. 154(b) by 379 days.

(21) Appl. No.: 13/926,185

(22) Filed: Jun. 25, 2013

(65) Prior Publication Data

US 2014/0376624 A1    Dec. 25, 2014

(51) Int. Cl.

| | |
|---|---|
| *H04N 7/12* | (2006.01) |
| *H04N 11/02* | (2006.01) |
| *H04N 11/04* | (2006.01) |
| *H04N 19/124* | (2014.01) |
| *H04N 19/159* | (2014.01) |
| *H04N 19/172* | (2014.01) |
| *H04N 19/14* | (2014.01) |
| *H04N 19/142* | (2014.01) |
| *H04N 19/152* | (2014.01) |
| *H04N 19/177* | (2014.01) |
| *H04N 19/40* | (2014.01) |
| *H04N 19/196* | (2014.01) |

(52) U.S. Cl.
CPC .............. *H04N 19/124* (2014.11); *H04N 19/14* (2014.11); *H04N 19/142* (2014.11); *H04N 19/152* (2014.11); *H04N 19/159* (2014.11); *H04N 19/172* (2014.11); *H04N 19/177* (2014.11); *H04N 19/198* (2014.11); *H04N 19/40* (2014.11)

(58) Field of Classification Search
CPC . H04N 19/149; H04N 19/198; H04N 19/154; H04N 19/179; H04N 19/142; H04N 19/124
See application file for complete search history.

(56) References Cited

U.S. PATENT DOCUMENTS

| | | | | |
|---|---|---|---|---|
| 6,094,457 | A * | 7/2000 | Linzer | H04H 20/30 348/385.1 |
| 6,473,459 | B1 * | 10/2002 | Sugano | H04N 19/142 375/240.16 |
| 7,362,809 | B2 | 4/2008 | Booth et al. | |
| 8,290,045 | B2 | 10/2012 | Ramachandran et al. | |
| 2006/0203907 | A1 * | 9/2006 | Yang | H04N 19/159 375/240.03 |

(Continued)

OTHER PUBLICATIONS

Karunakar, A. K. and Manohara Pai, M. M., Motion Prediction and Motion Vector Cost Reduction during Fast Block Motion Estimation in MCTF, International Journal of Electrical and Electronics Engineering, May 2010, pp. 181-186, issue 4:3.

(Continued)

*Primary Examiner* — Jeremiah C Hallenbeck-Huber
*Assistant Examiner* — Boubacar Abdou Tchoussou

(57) ABSTRACT

A video processing device includes a complexity estimation module to determine a first sum of variances metric and a first estimated picture encoding cost metric for a first picture of a video stream. The video processing device further includes a scene analysis module to determine a first threshold based on a first statistical feature for sum of variance metrics of a set of one or more pictures preceding the first picture in the video stream and a second threshold based on a second statistical feature for estimated picture encoding cost metrics of the set of one or more pictures. The scene analysis module further is to identify a scene change as occurring at the first picture based on the first sum of variances metric, the first estimated picture encoding cost metric, the first threshold, and the second threshold.

10 Claims, 7 Drawing Sheets

(56) References Cited

U.S. PATENT DOCUMENTS

| | | | | |
|---|---|---|---|---|
| 2006/0239347 | A1* | 10/2006 | Koul | H04N 5/147 375/240.12 |
| 2008/0031333 | A1 | 2/2008 | Li et al. | |
| 2009/0097546 | A1* | 4/2009 | Lee | H04N 19/61 375/240.02 |
| 2009/0268097 | A1* | 10/2009 | Lin | H04N 19/87 348/700 |
| 2010/0316129 | A1 | 12/2010 | Zhao et al. | |
| 2011/0002381 | A1 | 1/2011 | Yang et al. | |
| 2011/0051809 | A1* | 3/2011 | Lee | H04N 19/107 375/240.08 |
| 2012/0219054 | A1 | 8/2012 | Daub et al. | |
| 2012/0257675 | A1 | 10/2012 | Wang et al. | |
| 2013/0272415 | A1 | 10/2013 | Zhou | |
| 2014/0376886 | A1* | 12/2014 | Pettersson | H04N 5/147 386/241 |

OTHER PUBLICATIONS

U.S. Appl. No. 13/450,870, entitled "Detection of Video Feature Based on Variance Metric," filed on Apr. 19, 2012.

U.S. Appl. No. 13/926,179, entitled "Quantization Parameter Adjustment Based on Sum of Variance and Estimated Picture Encoding Cost," filed Jun. 25, 2013.

Non-Final Office Action mailed Feb. 26, 2016 for U.S. Appl. No. 13/926,179, 18 pages.

* cited by examiner

SCENE CHANGE DETECTION USING SUM OF VARIANCE AND ESTIMATED PICTURE ENCODING COST

CROSS-REFERENCE TO RELATED APPLICATIONS

The present disclosure is related to U.S. patent application Ser. No. 13/926,179, entitled "Quantization Parameter Adjustment Based on Sum of Variance and Estimated Picture Encoding Cost," and filed on even date herewith, the entirety of which is incorporated by reference herein.

FIELD OF THE DISCLOSURE

The present disclosure generally relates to video processing and more particularly relates to video encoding and transcoding.

BACKGROUND

Video encoding or transcoding frequently is used to reduce the amount of video data to be stored or transmitted or to convert a video signal from one format to another. Effective transcoding often relies on the accurate detection of scene features present in the video content, such as scene changes, fade-in transitions, fade-out transitions, flashes, and the like. Conventional techniques for identifying these features, such as by detecting a change in sound level for identifying a scene change, often are inefficient or ineffective at identifying the corresponding feature.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-7 illustrate techniques to facilitate efficient encoding or transcoding of an input video stream. During the encoding/transcoding process, a scaled motion search (SMS) process or other motion estimation process is employed. Such motion estimation techniques employ calculations of the sum of variances (referred to herein as "SVAR") and the estimated picture encoding cost (referred to herein as "PCOST"), which reflects the estimated number of encoding bits that will need to be allocated to the picture being encoded. Recognizing that these metrics are relatively symmetric representations of image complexity, in at least one embodiment, a rate control module dynamically modifies the quantization parameters (QPs) used in the quantization process based on SVAR and PCOST metrics. In some embodiments, the SVAR and PCOST metrics are used to set an initial quantization parameter (QP) for each picture type, which include the intra-coded picture (I-picture); the forward predicted frame (P-picture), and the bi-directional predicted picture (B-picture). After an initial configuration of these set of QPs, the rate control module may dynamically adjust the QPs based on changes in the SVAR and PCOST metrics observed in the input video stream. Under this approach, the rate control module can more optimally tailor the QPs used in the encoding process to the particular complexities of the frames being encoded with better performance compared to two-pass encoding methods. Further, in some embodiments, a scene analysis module uses the SVAR and PCOST metrics to identify scene features, such as scene changes, fade-ins and fade-outs, flashes, 3:2 pull-down, and the like. The identification of scene features can be used in rate control, picture type/coding mode selection, improving coding efficiency, and the like.

For ease of illustration, the techniques of the present disclosure are described in the example context of the ITU-T H.264 encoding standards, which are also commonly referred to as the MPEG-4 Part 10 standards or the Advanced Video Coding (AVC) standards. However, the techniques of the present disclosure are not limited to this context, but instead may be implemented in any of a variety of block-based video compression techniques that employ field-based frames, examples of which include the MPEG-2 standards and the ITU-T H.263 standards.

Figure 1:
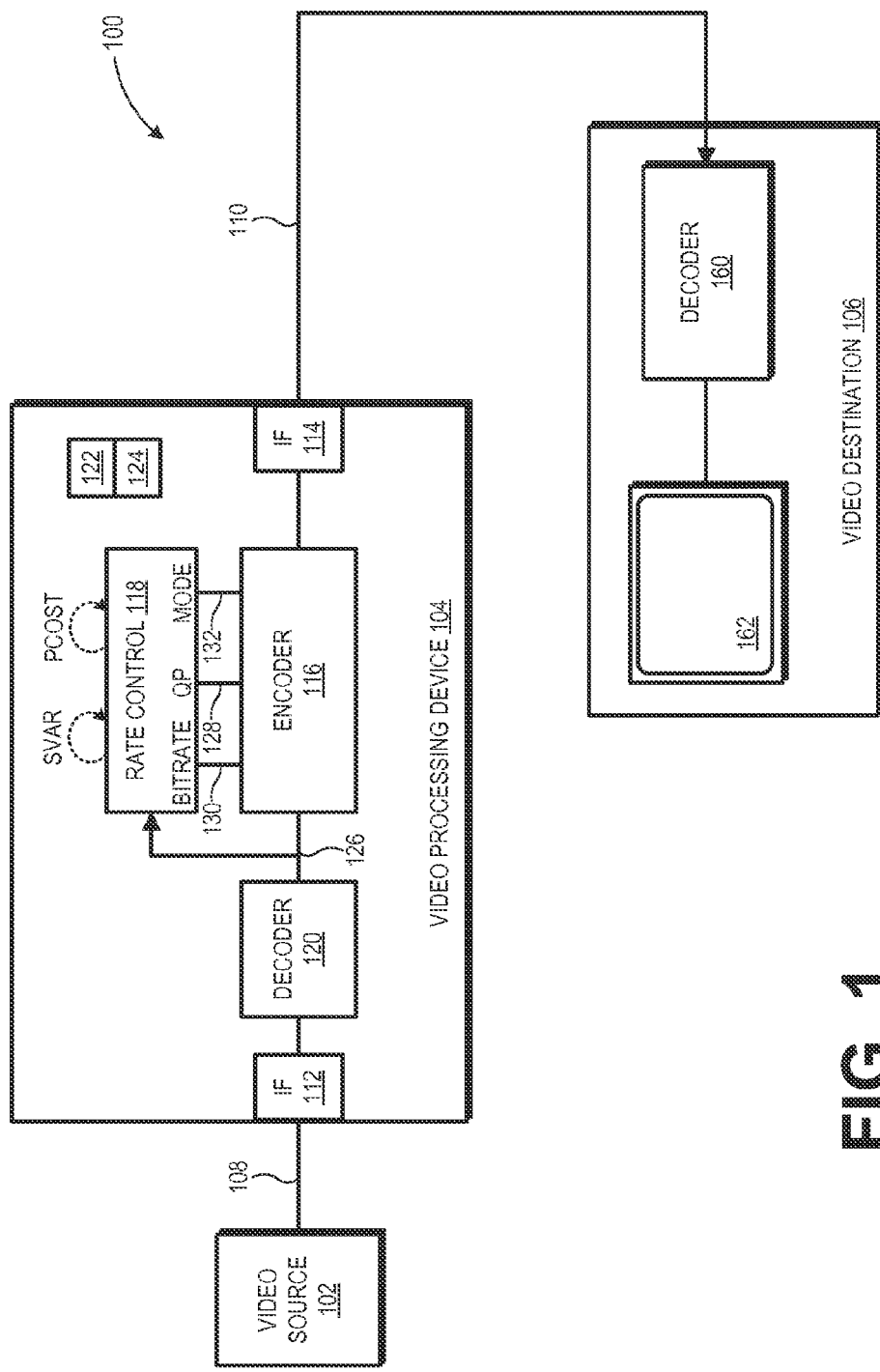
FIG. 1 is a block diagram illustrating a multimedia system in accordance with at least one embodiment of the present disclosure.

FIG. 1 illustrates, in block diagram form, a multimedia system 100 in accordance with at least one embodiment of the present disclosure. The multimedia system 100 includes a video source 102, a video processing device 104, and a video destination 106. The multimedia system 100 can represent any of a variety of multimedia systems in which encoding or transcoding can be advantageously used. In one embodiment, the multimedia system 100 is a distributed television system whereby the video source 102 comprises a terrestrial, cable, or satellite television broadcaster, an over-the-top (OTT) multimedia source or other Internet-based multimedia source, and the like. In this implementation, the video processing device 104 and the video destination 106 together are implemented as user equipment, such as a set-top box, a tablet computer or personal computer, a computing-enabled cellular phone, and the like. Thus, the video processing device 104 encodes or transcodes an input video stream and the resulting encoded video stream is buffered or otherwise stored in a cache, memory, hard drive or other storage device (not shown) until it is accessed for decoding and display by the video destination 106. As another example, the multimedia system 100 can comprise a video content server system, whereby the video source 102 comprises one or more hard drives or other mass-storage devices storing original video content, the video destination 106 is a remote computer system connected to the video content server via a network, and the video processing device 104 is used to transcode the video content responsive to current network conditions before the transcoded video content is transmitted to the remote computer system via the network.

In operation, the video source 102 transmits or otherwise provides an input video stream 108 to the video processing device 104 in either an analog format, such as a National Television System Committee (NTSC) or Phase Alternating Line (PAL) format, or a digital format, such as an H.263 format, an H.264 format, a Moving Picture Experts Group (MPEG) format (such as MPEG1, MPEG-2 or MPEG4), QuickTime format, Real Media format, Windows Media Video (WMV) or Audio Video Interleave (AVI), or other digital video format, either standard or proprietary. In instances whereby the input video stream 108 has an analog format, the video processing device 104 operates to encode the input video stream 108 to generate an encoded video stream 110, and in instances whereby the input video stream 108 has a digital format, the video processing device 104 operates to transcode the input video stream 108 to generate the encoded video stream 110. The resulting encoded video stream 110 is transmitted to the video destination 106, which can operate to decode and display the encoded video stream 110. To this end, the video destination 106 includes a decoder 160 and a display device 162. The decoder 160 operates to decode the encoded video stream 110 to generate a decoded video stream and then provide this decoded video stream to the display device 162.

In the illustrated embodiment, the video processing device 104 includes interfaces 112 and 114, an encoder 116, a rate control module 118, and, in instances whereby the video processing device 104 provides transcoding, a decoder 120. The interfaces 112 and 114 include interfaces used to communicate signaling with the video source 102 and the video destination 106, respectively. Examples of the interfaces 112 and 114 include input/output (I/O) interfaces, such as Peripheral Component Interconnect Express (PCIE), Universal Serial Bus (USB), Serial Attached Technology Attachment (SATA), wired network interfaces such as Ethernet, or wireless network interfaces, such as IEEE 802.11x or Bluetooth™ or a wireless cellular interface, such as a 3GPP, 4G, or LTE cellular data standard. The decoder 120, the encoder 116, and rate control module 118 each may be implemented entirely in hard-coded logic (that is, hardware), as the combination of software stored in a memory 122 and a processor 124 to access and execute the software, or as combination of hard-coded logic and software-executed functionality. To illustrate, in one embodiment, the video processing device 104 is implemented as a SOC whereby portions of the decoder 120, the encoder 116, and the rate control module 118 are implemented as hardware logic, and other portions are implemented via firmware stored at the SOC and executed by a processor of the SOC.

The hardware of the video processing device 104 can be implemented using a single processing device or a plurality of processing devices. Such processing devices can include a central processing unit (CPU), a graphics processing unit (GPU), a microcontroller, a digital signal processor, a field programmable gate array, programmable logic device, state machine, logic circuitry, analog circuitry, digital circuitry, or any device that manipulates signals (analog and/or digital) based on operational instructions that are stored in a memory, such as the memory 122. The memory 122 may be a single memory device or a plurality of memory devices. Such memory devices can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

In a transcoding mode, the decoder 120 operates to receive the input video stream 108 via the interface 112 and partially or fully decode the input video stream 108 to create a decoded data stream 126, which can include pixel information, motion estimation/detection information, timing information, and other video parameters. The encoder 116 receives the decoded data stream 126 and uses the video parameters represented by the decoded data stream to generate the encoded video stream 110, which comprises a transcoded representation of the video content of the original input video stream 108. The transcoding process implemented by the encoder 116 can include, for example, a stream format change (e.g., conversion from an MPEG-2 format to an AVC format), a resolution change, a frame rate change, a bit rate change, and the like. In an encoding mode, the decoder 120 is bypassed and the input video stream 108 is digitized and then encoded by the encoder 116 to generate the encoded video stream 110.

Block-based video encoding schemes generally utilize one or more motion estimation processes to encode the redundancy between two adjacent frames in a video stream. These motion estimation processes often rely on the calculation of various metrics concerning comparisons of macroblocks or other blocks of image frames. Such metrics can include, for example, the variances (often referred to as "VAR") of the pixels within a macroblock or other block of pixels, and the sum of such variances for all macroblocks or other blocks within a frame (or region of a frame)(this sum often referred to as "SVAR"). The variance of a pixel block represents the relative similarity or dissimilarity of the pixels within the pixel block. The sum of variances (SVAR) of pixel blocks within a frame (or region of a frame) can be interpreted as an indicator of the complexity of the frame. Another metric generated as part of the motion estimation process is the estimated picture encoding cost (PCOST), that is, the estimated number of bits needed to represent an encoded version of a picture. Any of a variety of well-known techniques for calculating these values may be used. To illustrate, these metrics may be byproducts of a scaled motion search (SMS) process performed for motion estimation. This SMS process can include, for example, the SMS processes described in U.S. Patent Application Publication No. 2010/0246682 (entitled "Scaled motion search section with downscaling and method for use therewith") and filed Mar. 29, 2009, the entirety of which is incorporated by reference herein.

In at least one embodiment, the rate control module 118 utilizes the SVAR and PCOST metrics generated during an SMS process or other motion estimation process for the input video stream 108 to dynamically determine and adjust various encoding parameters used by the encoder 116. In one embodiment, these encoding parameters include a control signal 128 (denoted "QP" in FIG. 1) to configure one or more quantization parameters used during by quantization process of the encoder 116, a control signal 130 (denoted "BITRATE" in FIG. 2) to configure the target bit allocation for one or more picture types, as well as a control signal 132 (denoted "MODE" in FIG. 1) to select an encoding mode to be employed by the encoder 116. As described in greater detail below with reference to FIG. 3, the rate control module 118 continuously monitors the complexity of the pictures to be encoded via the generated SVAR and PCOST to determine updated QP values and updated target bitrate allocations and signals the new QP values and target bitrate allocations via control signals 128 and 130, respectively. Moreover, as described in greater detail below with reference to FIGS. 4-7, the rate control module 118 also monitors the SVAR and PCOST metrics to facilitate detection of scene features, such as scene changes, fade-ins and fade-outs, or flashes, and controls the encoding mode of the encoder 116 in response (e.g., by signaling the encoder 116 to begin with a new I-frame in response to detecting a scene change).

Figure 2:
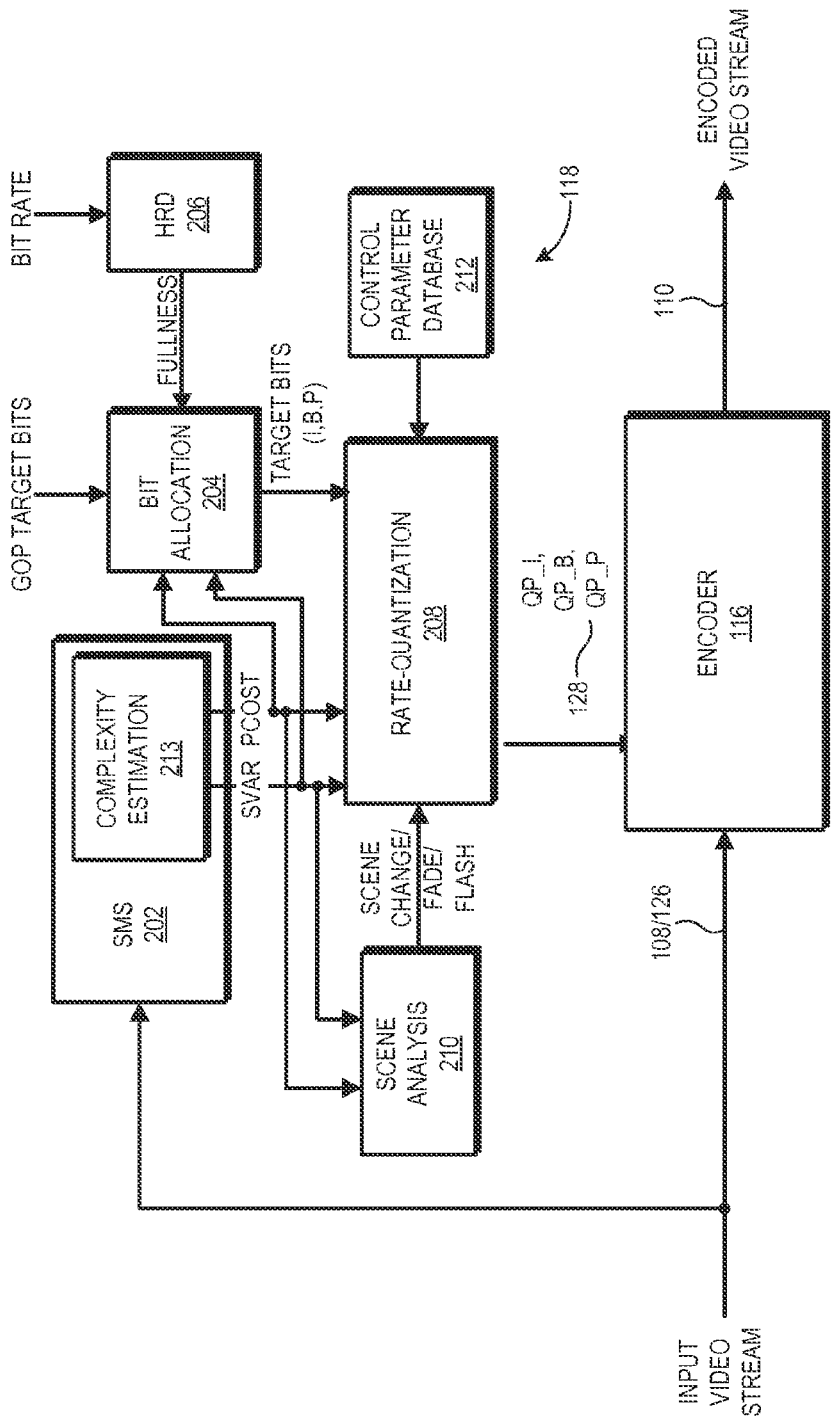
FIG. 2 is a block diagram illustrating an example configuration of a rate control module and an encoder of the multimedia system of FIG. 1 in accordance with at least one embodiment of the present disclosure.

FIG. 2 illustrates an example implementation of the rate control module 118 in greater detail in accordance with at least one embodiment of the present disclosure. In the depicted example, the rate control module 118 includes a SMS module 202, a bit allocation module 204, a hypothetical reference decoder (HRD) 206, a rate-quantization module 208, and a scene analysis module 210.

In operation, the encoder 116 employs a subtraction process and motion estimation process for data representing macroblocks of pixel values for a picture to be encoded. The motion estimation process, employed by the SMS module 202, compares each of these new macroblocks with macroblocks in a previously stored reference picture or pictures to find the macroblock in a reference picture that most closely matches the new macroblock. The motion estimation process then calculates a motion vector, which represents the horizontal and vertical displacement from the macroblock being encoded to the matching macroblock-sized area in the reference picture. The motion estimation process also provides this matching macroblock (known as a predicted macroblock) out of the reference picture memory to the subtraction process, whereby it is subtracted, on a pixel-by-pixel basis, from the new macroblock entering the encoder. This forms an error prediction, or "residual", that represents the difference between the predicted macroblock and the actual macroblock being encoded. The encoder 116 employs a two-dimensional (2D) discrete cosine transform (DCT) to transform the residual from the spatial domain. The resulting DCT coefficients of the residual are then quantized using a corresponding QP so as to reduce the number of bits needed to represent each coefficient. The quantized DCT coefficients then may be Huffman run/level coded to further reduces the average number of bits per coefficient. This is combined with motion vector data and other side information (including an indication of I, P or B pictures) for insertion into the encoded video stream 110.

For the case of P/B reference pictures, the quantized DCT coefficients also go to an internal loop that represents the operation of the decoder (a decoder within the encoder). The residual is inverse quantized and inverse DCT transformed. The predicted macroblock is read out of the reference picture memory is added back to the residual on a pixel by pixel basis and stored back into a memory to serve as a reference for predicting subsequent pictures. The encoding of I pictures uses the same process, except that no motion estimation occurs and the negative (−) input to the subtraction process is to be spatial predicted. In this case the quantized DCT coefficients represent residual values from spatial prediction rather than from both temporal and spatial prediction as was the case for P and B pictures. As is the case for P/B reference pictures, decoded I pictures are stored as reference pictures.

The rate-quantization module 208 uses the image complexity and target bit allocations as parameters for determining the QP, which in turn determines the degree of quantization performed by the encoder 116 and thus influences the bit rate of the resulting encoded video data. In one embodiment, the image complexity is estimated by an complexity estimation module 213 (implemented, for example, as part of the SMS module 202), which calculates a SVAR metric and a PCOST metric from the residuals and other pixel information of a picture as an estimate of image complexity for a picture to be encoded. The SVAR and PCOST metrics may be calculated using any of a variety of well-known algorithms. The bit allocations are represented by target numbers of bits that may be allocated at different granularities, such as per picture, GOP, slice, or block. In one embodiment, the HRD 206 maintains a model of the buffer fullness (e.g., a coded picture buffer (CPB)) of a modeled decoder at the video destination 106 (FIG. 1) receiving the encoded video stream 110. As described in greater detail below, the bit allocation module 204 determines the number of target bits to allocate based on the buffer fullness, the SVAR and PCOST metrics, the group of pictures (GOP) structure, and a specified target bit rate, which can include a specific bit rate or a bit rate range, using any of a variety of well-known bit allocation algorithms.

The rate-quantization module 208 uses the SVAR and PCOST metrics and the target bit allocation to calculate a value for QP that is expected to achieve the target bit rate when used to encode the picture data having the target bit allocation. In some embodiments, appropriate values for QP for corresponding values of the SVAR metric, the PCOST metric, and the target bit allocation are determined through empirical analysis of numerous video streams under varying test values of QP, and the corresponding identified QP values are stored in a control parameter database 212 (e.g., a lookup table) that receives an SVAR metric, a PCOST metric, and a target bit allocation as inputs and outputs a corresponding set of QP values. In other embodiments, curve-fitting or surface-fitting algorithms are employed to determine a mathematical function that suitably fits the SVAR/PCOST/target-bit-allocation data, and this mathematical function is coded as software or hardcoded logic in the rate-quantization module 208. Further, in some embodiments, each picture type is assigned a separate QP. Accordingly, the rate-quantization module 208 may separately calculate the appropriate QP for each picture type using the control parameter database 212 or an empirically-determined curve/surface-fitting formula, so as to generate a QP used for quantizing I pictures (QP_I), a QP used for quantizing P pictures (QP_P), and a QP used for quantizing B pictures (QP_B). Moreover, the rate-quantization module 208 may employ a QP limiter to dampen any rapid changes in a QP value caused by rapid fluctuations in the SVAR or PCOST metrics so as to provide stability and minimize perceptible variations in quality. The determined set of QP values (QP_I, QP_P, QP_B) is then signaled to the encoder 116 via the control signal 128.

In some embodiments, the operation of the rate-quantization module 208 and other components of the rate control module 218 are influenced by the presence of certain scene features in the input video stream 108. To illustrate, the rate-quantization module 208 may utilize the detection of a scene change in the input video stream 108 to reinitialize the set of QP values for encoding the corresponding scene. As another example, a detected scene change or fade (fade-in or fade-out) can trigger the encoder 116 to start a new GOP by encoding the picture following the detected scene change or fade as an I picture. As another example, detection of a repeat picture in the input stream can be used as evidence of the presence of 3:2 pull-down in the input video stream, which in turn permits more efficient encoding as bits that otherwise would have been allocated to the repeat pictures present in 3:2 pull-down instead may be allocated to encoding other non-repeating pictures. As described in greater detail with reference to FIGS. 5-7, in some embodiments the scene analysis module 210 uses the SVAR and PCOST metrics to facilitate the detection of scene features in the input video stream 108.

Figure 3:
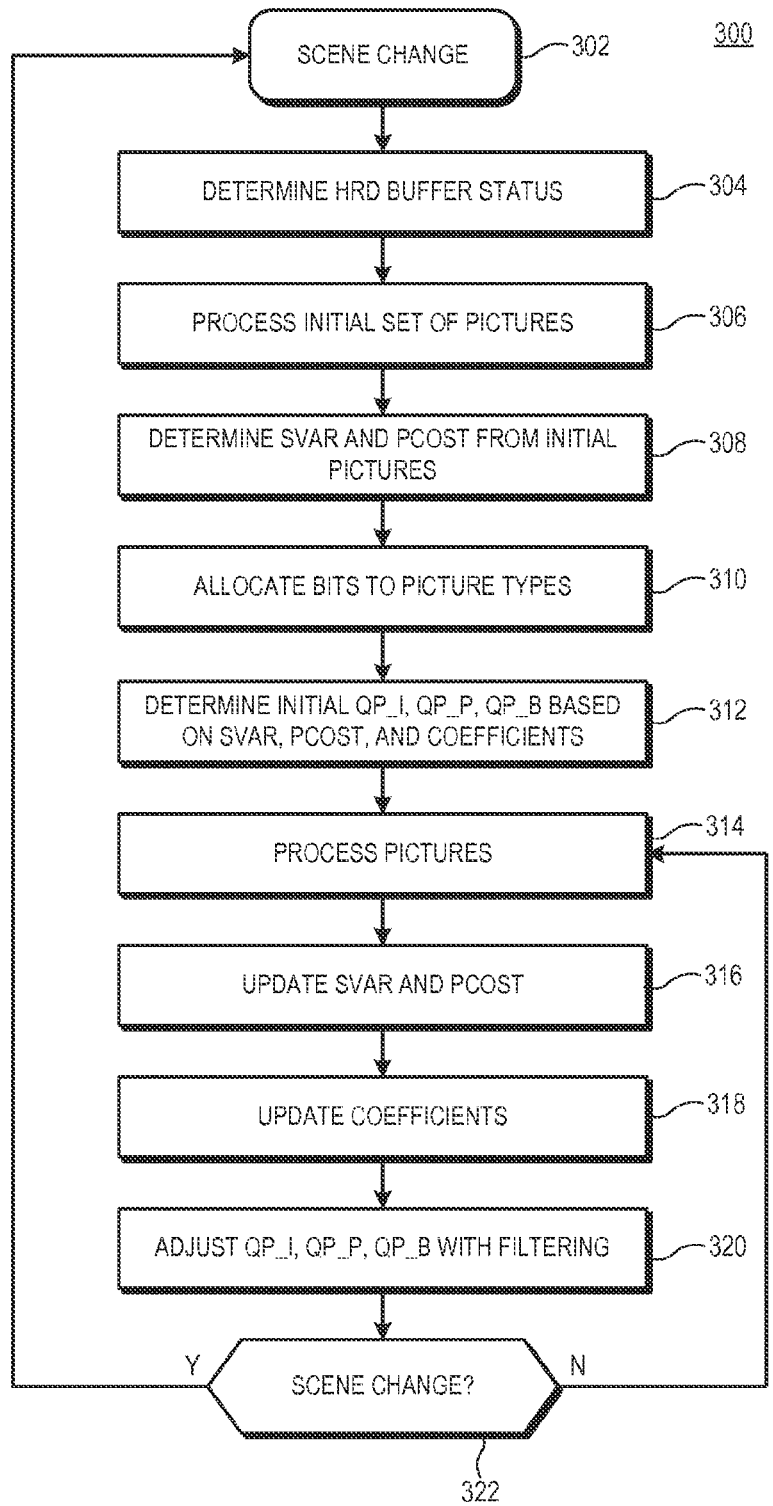
FIG. 3 is a flow diagram illustrating a method for adaptive quantization parameter adjustment in accordance with at least one embodiment of the present disclosure.

FIG. 3 illustrates an example method 300 for setting quantization parameters for encoding different picture types based on SVAR and PCOST metrics in accordance with at least one embodiment of the present disclosure. For ease of illustration, the method 300 is described in the example context of the multimedia system 100 of FIG. 1 and the rate control module 118 of FIG. 2. The method 300 initiates with a detection of a scene change in the input video stream 108 being processed. For the purposes of illustration, the initial picture in the input video stream 108 is considered a "scene change." The scene change can be detected using any of a variety of conventional techniques, such as volume change analysis of the accompanying audio stream, or using a scene feature technique as disclosed below with reference to FIGS. 4-7.

A scene change typically suggests a significant change in the content of the input video stream 108, which in turn suggests a significant change in the encoding requirements for encoding the sequence of pictures following the scene change. Accordingly, in response to an assertion of the "SCENE CHANGE" signal by the scene analysis module 210, the rate quantization module 208 and the bit allocation module 204 begin to gather various metrics used to calculate target bit allocations and quantization parameters for the various picture types. To this end, at block 304, the bit allocation module 204 accesses the current buffer fullness estimated by the HRD 206 for the receiving buffer of the decoder 160. The current buffer fullness serves as an indicator of whether the decoder 160 is potentially nearing an overflow or underflow condition, and thus serves as one factor in setting the target bit allocations and picture-type quantization parameters.

In order to obtain a more complete assessment of the pictures following the scene change, at block 306 the SMS module 202 performs an SMS process on an initial set of pictures comprising the first few pictures following the change and at block 308 the complexity estimation module 213 of the SMS module 202 provides an initial SVAR metric and an initial PCOST metric from the initial SMS processing. Typically, the SMS process generates a SVAR metric and a PCOST metric for each picture processed. If the initial set of pictures includes only one picture, the initial SVAR metric and the initial PCOST metric can be set to the SVAR metric and PCOST metric, respectively, of the single initial picture. In the event that the initial set of pictures includes more than one picture, and thus multiple SVAR values and PCOST values, the initial SVAR metric can include, for example, an average of the SVAR values, a median of the SVAR values, a maximum of the SVAR values, a minimum of the SVAR values, and the like, and the initial PCOST metric may be set in a similar manner.

With the initial SVAR and PCOST metrics determined, at block 310 the bit allocation module 204 determines the target bit allocation for each of the I, P, and B picture types. In one embodiment, the target bit allocations for the different picture types are based on mappings of particular values for the SVAR metric, the PCOST metric, the buffer fullness metrics, as wells as other inputs, such as the GOP structure of the input video stream 108, to corresponding target bit allocations for the different picture types. These mappings are maintained in the control parameter database 212, which may be populated with mapping data determined from empirical analysis of numerous test or sample video streams. Under this approach, numerous test video streams may be subjected to different encodings using different control parameters, and the resulting encoded streams analyzed to identify control parameters (target bit allocations and quantization parameter values) that provide a more optimal balance of video quality and encoding efficiency. These identified control parameters thus may be associated with the SVAR metric, PCOST metric, the coded picture buffer (CPB) fullness, and GOP structure observed for the corresponding test video stream. In other embodiments, a surface-fitting algorithm may be employed to determine a formula that suitably fits the data points generated from the analysis of these test video streams. To illustrate, the inventors have discovered that suitable target bit allocations may be achieved by setting the target bit allocation for I pictures proportional to the SVAR metric and indirectly proportional to the PCOST metric, and, conversely, setting the target bit allocations for P pictures and B pictures proportional to the PCOST metric and inversely proportional to the SVAR metric. Equations 1, 2, and 3 below represent this relationship:

$$\text{Target\_Bit\_I} = f(SVAR) + f\left(\frac{1}{PCOST}\right) + f(FULLNESS, GOP) \quad \text{Eq. 1}$$

$$\text{Target\_Bit\_B} = f(PCOST) + f\left(\frac{1}{SVAR}\right) + f(FULLNESS, GOP) \quad \text{Eq. 2}$$

$$\text{Target\_Bit\_P} = f(PCOST) + f\left(\frac{1}{SVAR}\right) + f(FULLNESS, GOP) \quad \text{Eq. 3}$$

where Target_Bit_I represents the target bit allocation for I pictures, Target_Bit_B represents the target bit allocation for B pictures, Target_Bit_P represents the target bit allocation for P pictures, FULLNESS represents the current buffer fullness from the HRD 206, and GOP represents the GOP structure.

With the target bit allocations determined, at block 312 the rate-quantization module 208 determines initial values for the quantization parameter for I pictures (QP_I), the quantization parameter for P pictures (QP_P), and the quantization parameter for B pictures (QP_B) based on the target bit allocations and the initial SVAR and PCOST metrics. The inventors have discovered that suitable values for this set of quantization parameters can be obtained by setting QP_I proportional to the SVAR metric and inversely proportional to the target bit allocation for I pictures, and setting QP_P and QP_B proportional to the PCOST metric and inversely proportional to the target bit allocation for the P picture or the B picture. In particular, Equations 4-6 have been found to provide suitable initial values for the quantization parameter set:

$$QP\_I = a * \log_2(SVAR) + \frac{b}{\log_2(\text{Target\_Bit\_I})} + c \quad \text{Eq. 4}$$

$$QP\_P = d * \log_2(PCOST) + \frac{e}{\log_2(\text{Target\_Bit\_P})} + f \quad \text{Eq. 5}$$

$$QP\_B = g * \log_2(PCOST) + \frac{h}{\log_2(\text{Target\_Bit\_B})} + i \quad \text{Eq. 6}$$

where a, b, c, d, e, f, g, h, and i are coefficients, which are initially set to predetermined default values and which may be dynamically updated as encoding of the sequence of pictures following a scene change processes, as described below. Different sets of coefficients may be used for different picture resolutions.

With the initial control parameters set, at block 314 the encoder 116 begins processing pictures following the initial set of pictures following the scene change using the target bit allocations determined at block 310 and the initial values of QP_I, QP_P, and QP_B determined at block 312.

Although encoding context changes within a scene typically are not as abrupt as encoding context changes between scenes, in some embodiments the rate control module 118 dynamically adjusts the values of the set of quantization parameters used by the encoder 116 in encoding intra-scene picture sequences so as to provide quantization parameters that more closely reflect the current picture complexity and thus provide more efficient encoding. To this end, at block 316 the complexity estimation module 213 determines an SVAR metric and a PCOST metric for the picture encoded at block 314 and at block 318 the rate quantization module 208 updates or adjusts the coefficients used to determine the updates to the quantization parameters to reflect the relationship between the actual number of encoding bits used to encode the picture and the target number of bits allocated for encoding the picture type. To illustrate, the updates or adjustments to each of the quantization parameters may be determined based on the following equations:

$$\Delta QP\_I = l * \log_2 \left( \frac{SVAR\_curr}{SVAR\_prev} \right) \quad \text{Eq. 7}$$

$$\Delta QP\_P = m * \log_2 \left( \frac{PCOST\_curr}{PCOST\_prev} \right) \quad \text{Eq. 8}$$

$$\Delta QP\_B = n * \log_2 \left( \frac{PCOST\_curr}{PCOST\_prev} \right) \quad \text{Eq. 9}$$

whereby $\Delta QP\_I$ is the adjustment made to the QP_I parameter, $\Delta QP\_P$ is the adjustment made to the QP_P parameter, $\Delta QP\_B$ is the adjustment made to the QP_B parameter, SVAR_curr is the current calculated SVAR metric, SVAR_prev is the previously calculated SVAR metric, PCOST_curr is the current calculated PCOST metric, PCOST_prev is the previously calculated PCOST metric, and l, m, and n are proportional coefficients in the region of 1-6 for AVC-based implementations, and which may be initialized according to picture type, bitrate, and adaptively adjusted by feedback representing the actual number of encoding bits used by the last picture encoded.

With the coefficients updated based on the last picture encoded, at block 320, the rate-quantization module 208 dynamically updates the values for QP_I, QP_P, and QP_B based on an application of Equations 7-9 using the updated coefficients and the SVAR and PCOST metric from the picture encoded at block 314. The QP values also are adjusted according to the HRD buffer status when appropriate. In some embodiments, to prevent abrupt changes in a QP value from manifesting in discernible visual artifacts or substantial changes in buffer fullness, the rate-quantization module 208 can include a filter to limit the rate of change of the QP values. To illustrate, the QP value generated from application of Equations 7-9 can be averaged with one or more previous QP values to limit the rate of change in a quantization parameter for a picture type, or specified change limiting thresholds may be used to limit the amount of change in a quantization parameter at any given time.

At block 322, the rate-quantization module 208 evaluates the signaling from the scene analysis module 210 to determine if a scene change has occurred since the scene change detected at block 302. If not, the method flow returns to block 314, whereupon the next picture in the input video stream 108 is encoded using the QP values determined at block 320, and the update process of blocks 316-322 begins anew with the SVAR and PCOST metrics determined from the encoding of this picture. Otherwise, if a scene change is detected, the method flow returns to block 302, whereupon the method 300 is repeated for the next sequence of pictures following the scene change.

Figure 4:
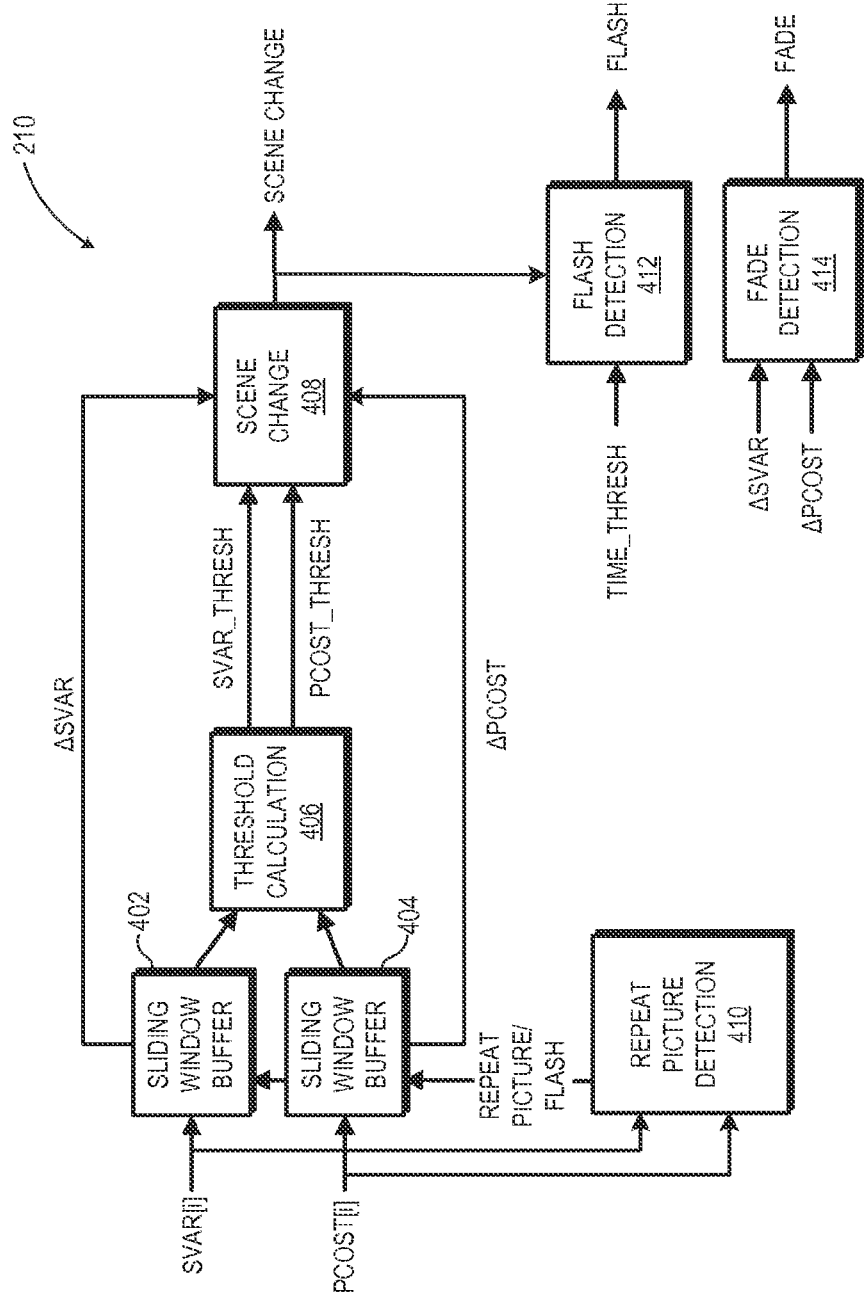
FIG. 4 is a block diagram illustrating an example configuration of a scene change detection module of the multimedia system of FIG. 1 in accordance with at least one embodiment of the present disclosure.

FIG. 4 illustrates an example implementation of the scene analysis module 210 of FIG. 2 in accordance with some embodiments. In the depicted example, the scene analysis module 210 includes sliding window buffers 402 and 404, a threshold calculation module 406, a scene change detection module 408, a repeat frame detection module 410, a flash detection module 412, and a fade detection module 414. The sliding window buffer 402 comprises a first-in first-out (FIFO) buffer having X entries to store the SVAR metrics from the X most recent pictures processed by the SMS module 202. Likewise, the sliding window buffer 404 comprises a FIFO buffer having X entries to store the PCOST metrics from the X most recent pictures processed by SMS module 202. As such, the sliding window buffers 402 and 404 act as sliding windows on the most recent historical SVAR and PCOST metrics generated by the SMS module 202.

As described in greater detail below, thresholds pertaining to the SVAR and PCOST metrics are used to detect scene changes. These thresholds include a SVAR-related metric referred to herein as SVAR_THRESH and a PCOST-related metric referred to herein as PCOST_THRESH. The threshold calculation module 406 calculates the SVAR_THRESH and PCOST_THRESH thresholds based on statistical features of the SVAR metrics and PCOST metrics in the sliding window represented by the sliding window buffers 402 and 404. Based on an observation that SVAR and PCOST are either relatively constant or changing constantly within the same scene, the threshold calculation module 406, in one embodiment, calculates SVAR_THRESH and PCOST_THRESH based on the mean and the mean squared error (MSE) of the historical metrics stored in the sliding window buffers 402 and 404, respectively. In particular, the thresholds may be determined in accordance with Equations 10 and 11 below:

$$SVAR\_THRESH = A * MEAN\_SVAR + B * MSE\_SVAR + C \quad \text{Eq. 10}$$

$$PCOST\_THRESH = D * MEAN\_PCOST + E * MSE\_PCOST + F \quad \text{Eq. 11}$$

where MEAN_SVAR and MSE_SVAR are the statistical mean and MSE, respectively, of the SVAR metrics in the sliding window buffer 402, MEAN_PCOST and MSE_PCOST are the statistical mean and MSE, respectively, of the PCOST metrics in the sliding window buffer 404, and A, B, C, D, E, and F are scaling coefficients, which may be determined via, for example, empirical or experimental analysis. Different sets of scaling coefficients may be used for different picture resolutions.

The scene change detection module 408 operates to detect whether a current picture being processed represents a scene change from the previous picture based on a comparison of the threshold SVAR_THRESH to $|\Delta SVAR|$ (representing the magnitude of the difference between the SVAR metric of the current picture and the SVAR metric of the previous picture) and based on a comparison of the threshold PCOST_THRESH to $\Delta PCOST$ (representing the difference between the PCOST metric of the current picture and the PCOST metric of the previous picture). An example method for detecting scene changes based on this analysis is described in greater detail below with reference of method 500 of FIG. 5.

The flash detection module 412 operates to detect a flash in the input video stream 108. In some embodiments, the flash detection module 412 signals a flash as being present in the input video stream when two scene changes are detected within a predetermined threshold time period (denoted "TIME_THRESH" in FIG. 4). The threshold time period may be represented as a predefined number of pictures, a predefined number of seconds or other time unit, and the like, and may be determined via, for example, empirical or experimental analysis. To illustrate, in one example implementation, the threshold time period TIME_THRESH is set to 60 milliseconds.

The fade detection module 414 operates to detect a fade-in or fade-out (collectively referred to as a "fade") in the input video stream 108. In some embodiments, the fade detection module 414 achieves fade detection through an analysis of the SVAR and PCOST metrics generated from the encoding of the sequence of pictures in the input video stream 108 and from scene changes detected by the scene change detection module 408. In particular, in one embodiment, in the event that the SVAR metric changes continuously in the same direction (that is, ΔSVAR is continuously positive or continuously negative) over a sequence of pictures and the PCOST metric for the first frame in the sequence is larger than the PCOST metric for the last frame in the sequence, the fade detection module 414 signals a fade. This process is described in greater detail below with reference to the method 600 of FIG. 6.

In certain implementations, such as when the video source 102 implemented a 3:2 pull-down encoding to generate the input video stream 108, repeat pictures may be present in the input video stream 108. The repeat picture detection module 410 operates to detect these repeat pictures in the input video stream. An example detection technique employed by the repeat detection module 410 is described in greater detail below with reference to FIG. 7. As the SVAR and PCOST metrics for repeat pictures represented in the sliding window buffers 402 and 404 may improperly skew the statistical features determined from the buffered SVAR and PCOST metrics, in at least one embodiment, the sliding window buffers 402 and 404 are configured to remove the SVAR and PCOST metrics for pictures identified as repeat pictures, thereby preventing repeat pictures from polluting the samples represented in the sliding windows.

Figure 5:
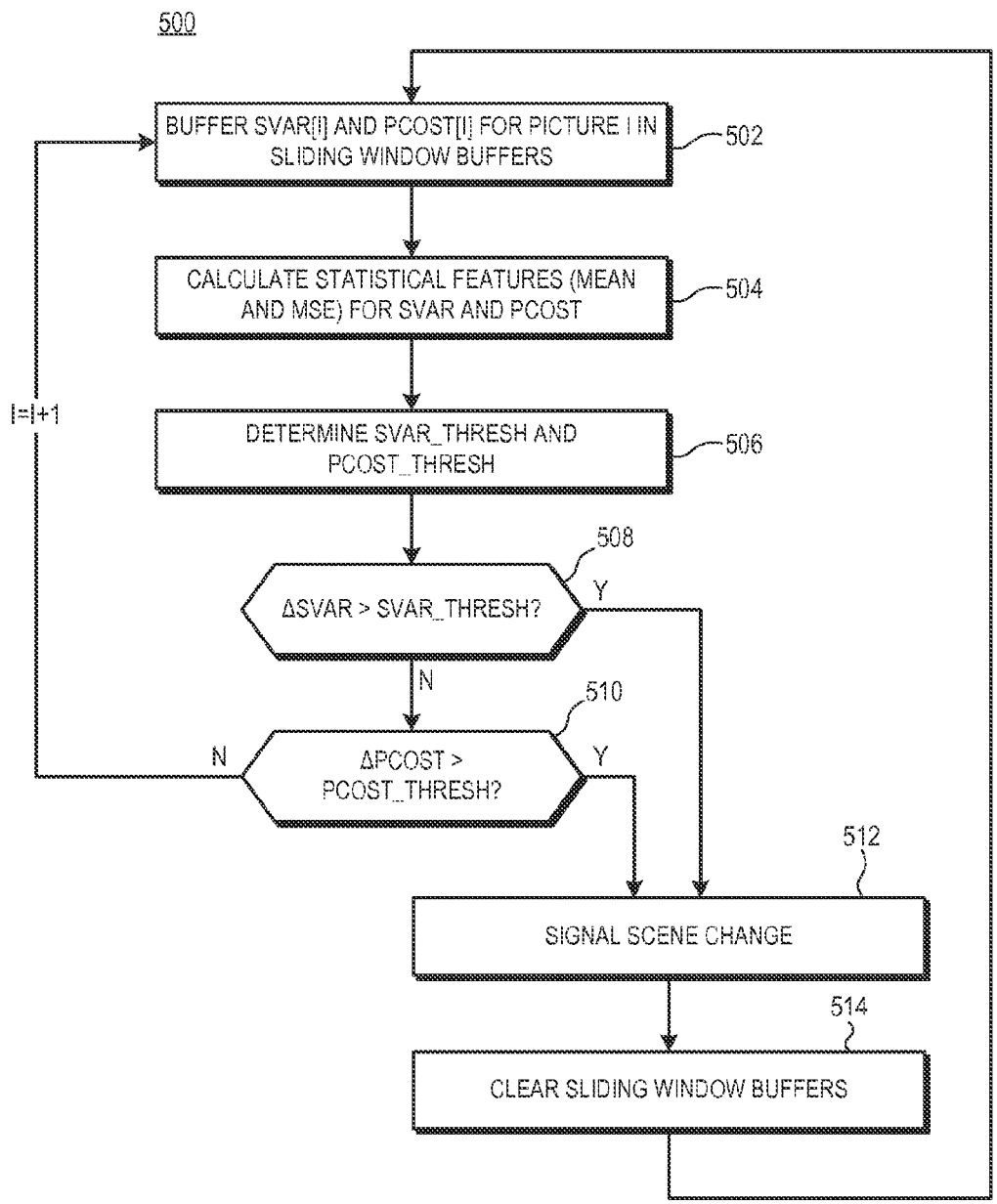
FIG. 5 is a flow diagram illustrating an example method for scene change detection in accordance with at least one embodiment of the present disclosure.

FIG. 5 illustrates an example method 500 for detecting a scene change in the input video stream 108 based on an analysis of the SVAR and PCOST metrics generated during an encoding process in accordance with at least one embodiment. The method 500 initiates at block 502, whereby a current picture ("picture i") is processed by the SMS module 202 and the resulting the SVAR metric and PCOST metric are stored in the sliding window buffers 402 and 404, respectively. As the sliding window buffers 402 and 404 represent sliding windows, the oldest SVAR metric in the sliding window buffer 402 may need to be shifted out to make room for the current SVAR metric, and the oldest PCOST metric in the sliding window buffer 404 may need to be shifted out to make room for the current PCOST metric.

At block 504, the threshold calculation module 406 calculates current statistical features (e.g., mean and MSE) for the SVAR metrics stored in the sliding window buffer 402 and for the PCOST metrics stored in the sliding window buffer 404. At block 506, the threshold calculation module 406 calculates current values for SVAR_THRESH and PCOST_THRESH through, for example, application of Equations 7 and 8 (described above) to the current mean and MSE statistical features for SVAR and PCOST. In some embodiments, one or more of the coefficients A, B, C, D, E, and F in Equations 7 and 8 may be adjusted to reflect changing relationships between the SVAR and PCOST metrics. For example, in response to detecting that the SVAR metric is decreasing, the threshold calculation module 406 may decrement one or more of the coefficients D, E, and F in Equation 8 used to calculate the threshold PCOST_THRESH, and in response to detecting that the SVAR metric is increasing, the threshold calculation module 406 may increment one or more of the coefficients D, E, and F. A similar approach may be taken for adjusting the coefficients A, B, and C in Equation 7 based on changes observed in the PCOST metric.

At block 508, the scene change detection module 408 compares the threshold SVAR_THRESH with the magnitude of the change in SVAR ($|\Delta SVAR|$) from the previous picture i−1 to the current picture i. At block 510, the scene change detection module 408 compares the threshold PCOST_THRESH with the change in PCOST (ΔPCOST) from the previous picture i−1 to the current picture i. Note that these comparisons may be made in either order, or in parallel.

In the event that $|\Delta SVAR|$ does not exceed SVAR_THRESH and ΔPCOST does not exceed PCOST_THRESH, no scene change is detected and thus the method flow returns to block 502 for the processing of the next picture. However, in the event that either $|\Delta SVAR|$ exceeds SVAR_THRESH or ΔPCOST exceeds PCOST_THRESH, at block 512 the scene change detection module 408 recognizes a scene change at picture i and thus signals a scene change to the rate-quantization module 208. Further, to prepare for detection of the next scene change, at block 514 the sliding window buffers 402 and 404 are cleared, and the method flow returns to block 502 for the next picture to be processed.

Figure 6:
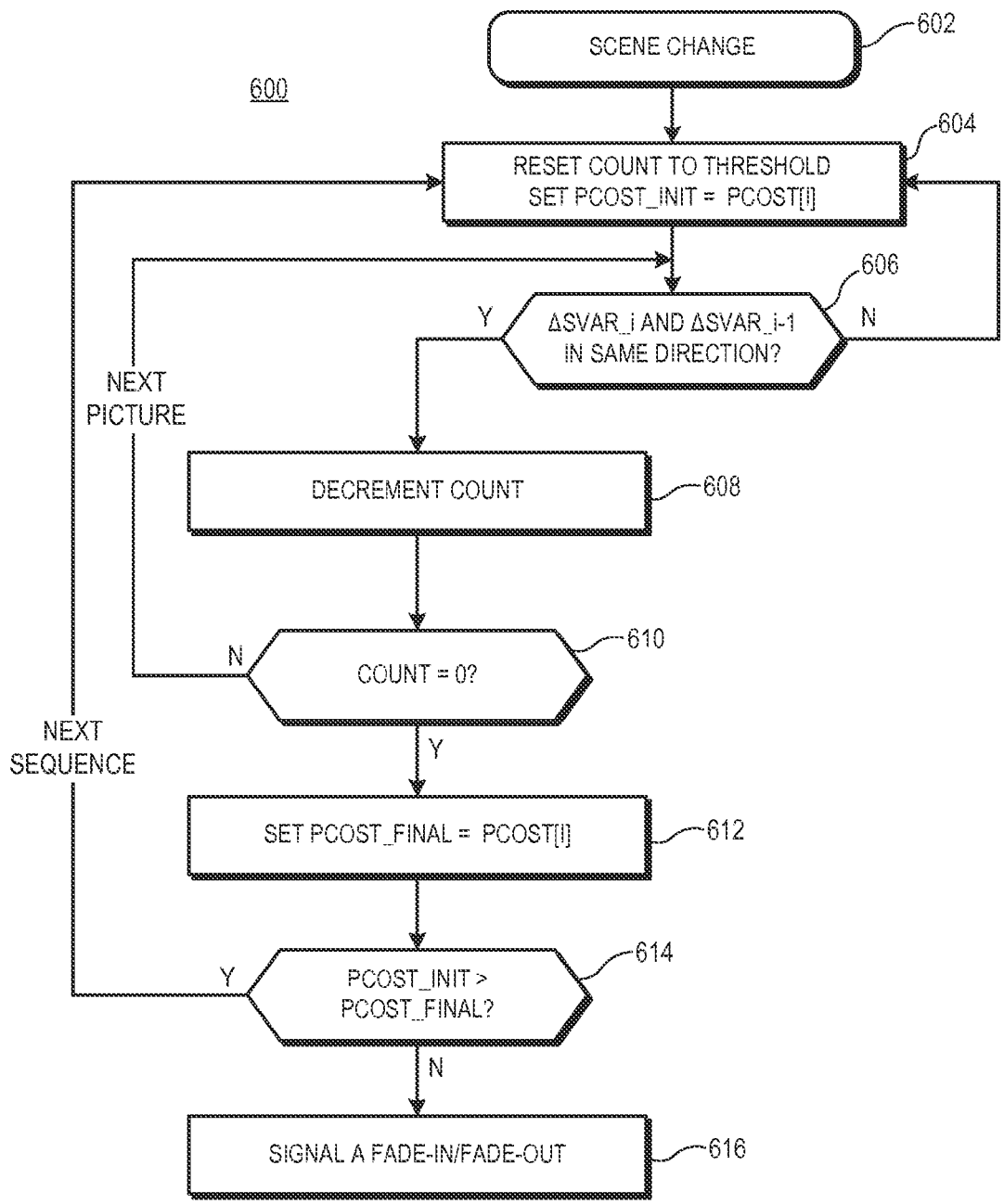
FIG. 6 is a flow diagram illustrating an example method for fade detection in accordance with at least one embodiment of the present disclosure.

FIG. 6 illustrates an example method 600 for fade detection using the SVAR and PCOST metrics in accordance with at least one embodiment. The method 600 initiates at block 602, whereupon a scene change is detected in the input video stream 108. In response, at block 604 the fade detection module 414 resets a counter to an initial value (that is, "COUNT"=threshold) that represents a threshold number of pictures processed to detect a fade. This threshold number may be identified through, for example, empirical analysis. Further, the fade detection module 414 sets a variable PCOST_INIT to the PCOST metric of the current picture ("picture i") being processed by the encoder 116. At block 606, the fade detection module 414 determines whether the change in SVAR is in the same direction as the previous change in SVAR in a previous iteration of block 606. That is, the fade detection module 414 determines whether there has been a change between the SVAR metric of the previous picture i−1 (SVAR_i−1) and the SVAR metric of the current picture i (SVAR_i) (this change identified as "ΔSVAR_i") that is in the same direction (i.e., has the same sign) as the previous change between the SVAR metric of the second previous picture i−2 (SVAR_i−2) and the SVAR metric of the previous picture i−1 (SVAR_i−1)(this change identified as "ΔSVAR_i−1"). If not, the method flow returns to block 604, whereupon the counter is reset to the threshold and the variable PCOST_INIT is set to the PCOST metric of the next picture to be processed. Otherwise, if the change in SVAR stays in the same direction, at block 608, the fade detection module 414 decrement the counter (COUNT=COUNT−1). At block 612, the fade detection module 414 determines whether the counter has reached zero. This condition indicates whether a change in same direction of the SVAR metric has been observed for the threshold number of adjacent pictures in the input video stream 108. If not, the method flow returns to block 606 for the next picture processed by the encoder 116.

Otherwise, if the counter has reached zero, thereby indicating that the SVAR metric has continuously changed in the same direction over the threshold number of pictures, at block 612 the fade detection module 414 sets a variable PCOST_FINAL to the PCOST metric of the current picture being processed. Thus, to test whether the PCOST metric at the beginning of the threshold picture sequence is larger than the PCOST metric at the end of the threshold picture sequence, the fade detection module 414 compares PCOST_INIT to PCOST_FINAL at block 614. If PCOST_INIT is greater than PCOST_FINAL, then a fade-in or fade-out feature is detected, and the fade detection module 414 signals a fade to the rate-quantization module 208 at block 616. The signaling of a fade can, for example, trigger the rate-quantization module 208 to signal the encoder 116 to encode the picture as an I-picture at the end of fade to provide a more accurate reference to other pictures, while allocating only a few bits to the between fade pictures. Otherwise, if PCOST_INIT is not greater than PCOST_FINAL, no fade feature is detected in the picture sequence, and thus the method flow returns to block 604 for analysis of a next sequence of pictures.

Figure 7:
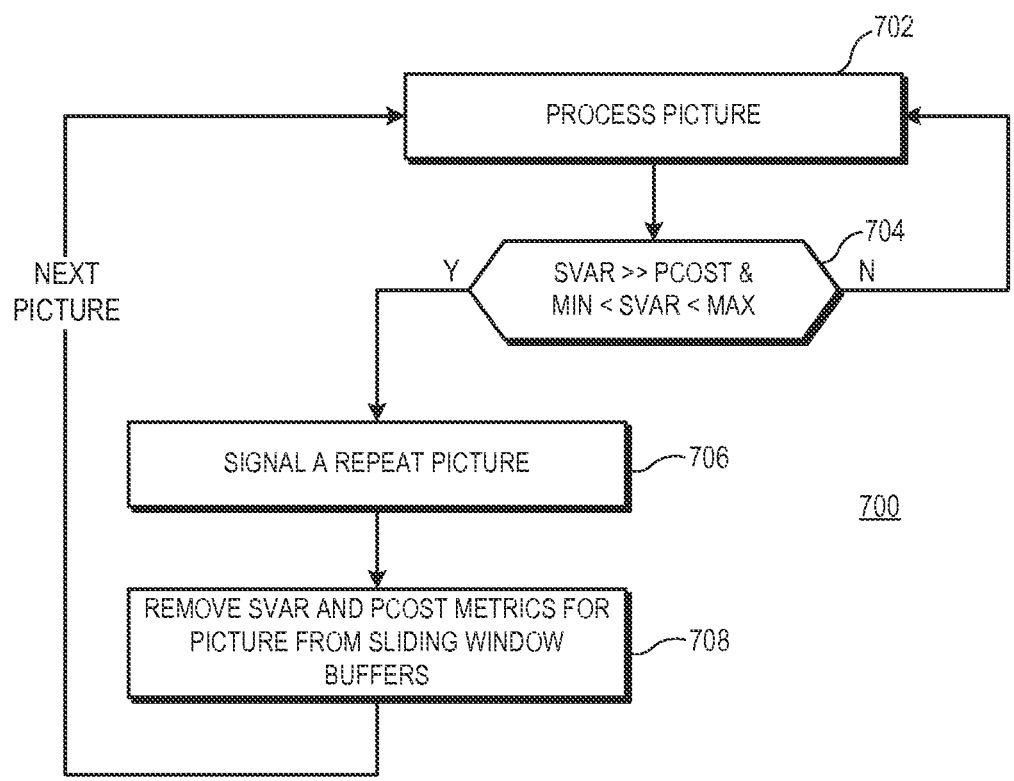
FIG. 7 is a flow diagram illustrating an example method for repeat frame detection in accordance with at least one embodiment of the present disclosure.

FIG. 7 illustrates an example method 700 for detecting repeat pictures in the input video stream 108 using SVAR and PCOST metrics in accordance with some embodiments of the present disclosure. The method 700 is based on a discovery that a repeat picture typically exhibits a SVAR metric that is much larger than its PCOST metric. This is because PCOST partially reflects the similarity between two adjacent pictures, and thus a repeat picture requires relatively few bits to encode as it is almost entirely redundant image content of the adjacent picture (which it repeats). However, the SVAR metric is independent of a picture's similarity with an adjacent picture, and instead reflects the variation of pixels within the picture itself. As such, the fact that a repeat picture is a repeat of the previous picture will not have any effect on the SVAR metric for the picture. Thus, after processing a picture for encoding at block 702, the repeat picture detection module 410 compares the SVAR and PCOST metrics from the processing of the picture at block 704, as well as comparing the SVAR metric to a resolution-related minimum threshold MIN and a resolution-related maximum threshold MAX that serve to prevent improper triggering off of a SVAR metric that is too small or too large. If the SVAR metric is significantly greater than the PCOST metric for the picture (by, for example, a magnitude of 10× or more) and the SVAR metric is between the MIN and MAX thresholds, the repeat picture detection module 410 signals a repeat picture at block 706. In response to the signaled repeat picture, at block 708 the sliding window buffers 402 and 404 remove the SVAR and PCOST metrics for the picture so as to prevent inclusion of the SVAR and PCOST metrics of a repeated picture from being used in the scene change detection process described above.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
performing at an encoder of a video processing device one of an encoding or a transcoding of a video stream;
determining, at the video processing device, a first sum of variances metric and a first estimated picture encoding cost metric for a first picture of the video stream;
determining, at the video processing device, a first threshold based on a first statistical feature for sum of variance metrics of a set of one or more pictures preceding the first picture in the video stream and based on a second statistical feature for the sum of variance metrics of the set of one or more pictures and determining a second threshold based on a first statistical feature for estimated picture encoding cost metrics of the set of one or more pictures and based on a second statistical feature for the estimated picture encoding cost metrics of the set of one or more pictures;
refraining from including a sum of variances metric and an estimated picture encoding cost metric of a picture of the set in determining the first statistical features responsive to determining the picture of the set is a repeat picture, wherein the picture is determined to be a repeat picture responsive to determining that the sum of variances metric of the picture of the set is more than a threshold multiple of the estimated picture encoding cost metric of the picture of the set;

modifying at least one of a bit rate or a quantization parameter of the one of the encoding or transcoding of the video stream responsive to identifying, at the video processing device, a scene change as occurring at the first picture based on the first sum of variances metric, the first estimated picture encoding cost metric, the first threshold, and the second threshold;

wherein the first statistical feature for the sum of variance metrics of the set of one or more pictures comprises a mean sum of variances metric;

wherein the second statistical feature for the sum of variance metrics of the set of one or more pictures comprises a mean squared error for the sum of variance metrics of the set of one or more pictures;

wherein the first statistical feature for the estimated picture encoding cost metrics of the set of one or more pictures comprises a mean estimated picture encoding cost metric; and wherein the second statistical feature for the estimated pictured encoding costs of the set of one or more pictures comprises a mean squared error for the estimated picture encoding cost metrics of the set of one or more pictures.

2. The method of claim 1, wherein identifying a scene change as occurring comprises: identifying a scene change as occurring at the first picture in response to at least one of: a difference between the first sum of variances metric and a second sum of variances metric of a second picture preceding the first picture in the video stream exceeding the first threshold; and a difference between the first estimated picture encoding cost metric and a second estimated picture encoding cost metric of the second picture exceeding the second threshold.

3. The method of claim 1, wherein: determining the first threshold comprises determining the first threshold based on a weighted sum of the first and second statistical features for the sums of variance metrics of the set of one or more pictures; and determining the second threshold comprises determining the second threshold based on a weighted sum of the first and second statistical features for the estimated picture encoding cost metrics of the set of one or more pictures.

4. The method of claim 1, wherein: a scene change is identified at the first picture; and identifying a flash in the video stream responsive to identifying another scene change within a threshold duration from the first picture.

5. A video processing device comprising:
an encoder to one of encode or transcode a video stream;
a complexity estimation module to determine a first sum of variances metric and a first estimated picture encoding cost metric for a first picture of the video stream;
a scene analysis module to determine a first threshold based on a first statistical feature for sum of variance metrics of a set of one or more pictures preceding the first picture in the video stream and based on a second statistical feature for the sum of variance metrics of the set of one or more pictures and determine a second threshold based on a first statistical feature for estimated picture encoding cost metrics of the set of one or more pictures and based on a second statistical feature for the estimated picture encoding cost metrics of the set of one or more pictures;
wherein the encoder modifies at least one of a bit rate or a quantization parameter of the one of the encoding or transcoding of the video stream responsive to the scene analysis module identifying a scene change as occurring at the first picture based on the first sum of variances metric, the first estimated picture encoding cost metric, the first threshold, and the second threshold;
wherein the scene analysis module refrains from including a sum of variances metric and an estimated picture encoding cost metric of a picture of the set in determining the first statistical features responsive to determining the picture of the set is a repeat picture, wherein the picture is determined to be a repeat picture responsive to determining that the sum of variances metric of the picture of the set is more than a threshold multiple of the estimated picture encoding cost metric of the picture of the set;

wherein the first statistical feature for the sum of variance metrics of the set of one or more pictures comprises a mean sum of variances metric;

wherein the second statistical feature for the sum of variance metrics of the set of one or more pictures comprises a mean squared error for the sum of variance metrics of the set of one or more pictures;

wherein the first statistical feature for the estimated picture encoding cost metrics of the set of one or more pictures comprises a mean estimated picture encoding cost metric; and wherein the second statistical feature for the estimated pictured encoding costs of the set of one or more pictures comprises a mean squared error for the estimated picture encoding cost metrics of the set of one or more pictures.

6. The video processing device of claim 5, wherein the scene analysis module is to determine a scene change as occurring by: identifying a scene change as occurring at the first picture in response to at least one of: a difference between the first sum of variances metric and a second sum of variances metric of a second picture preceding the first picture in the video stream exceeding the first threshold; and a difference between the first estimated picture encoding cost metric and a second estimated picture encoding cost metric of the second picture exceeding the second threshold.

7. The video processing device of claim 5, wherein: a scene change is identified at the first picture; and the scene analysis module identifies a flash in the video stream responsive to identifying another scene change within a threshold duration from the first picture.

8. A non-transitory computer readable medium storing a set of executable instructions, the set of executable instructions comprising instructions to manipulate at least one processor to:
perform one of an encoding or a transcoding of a video stream;
determine a first sum of variances metric and a first estimated picture encoding cost metric for a first picture of the video stream;
determine a first threshold based on a first statistical feature for sum of variance metrics of a set of one or more pictures preceding the first picture in the video stream and based on a second statistical feature for the sum of variance metrics of the set of one or more pictures and determine a second threshold based on a first statistical feature for estimated picture encoding cost metrics of the set of one or more pictures and based on a second statistical feature for the estimated picture encoding cost metrics of the set of one or more pictures;
refrain from including a sum of variances metric and an estimated picture encoding cost metric of a picture of the set in determining the first statistical features responsive to determining the picture of the set is a repeat picture, wherein the picture is determined to be a repeat picture responsive to determining that the sum of variances metric of the picture of the set is more than a threshold multiple of the estimated picture encoding cost metric of the picture of the set;

modify at least one of a bit rate or a quantization parameter of the one of the encoding or transcoding of the video stream responsive to identifying a scene change as occurring at the first picture based on the first sum of variances metric, the first estimated picture encoding cost metric, the first threshold, and the second threshold;

wherein the first statistical feature for the sum of variance metrics of the set of one or more pictures comprises a mean sum of variances metric;

wherein the second statistical feature for the sum of variance metrics of the set of one or more pictures comprises a mean squared error for the sum of variance metrics of the set of one or more pictures;

wherein the first statistical feature for the estimated picture encoding cost metrics of the set of one or more pictures comprises a mean estimated picture encoding cost metric; and wherein the second statistical feature for the estimated pictured encoding costs of the set of one or more pictures comprises a mean squared error for the estimated picture encoding cost metrics of the set of one or more pictures.

9. The computer readable medium of claim 8, wherein the instructions to manipulate at least one processor to identify a scene change as occurring comprise instructions to manipulate at least one processor to: identify a scene change as occurring at the first picture in response to at least one of: a difference between the first sum of variances metric and a second sum of variances metric of a second picture preceding the first picture in the video stream exceeding the first threshold; and a difference between the first estimated picture encoding cost metric and a second estimated picture encoding cost metric of the second picture exceeding the second threshold.

10. The computer readable medium of claim 9, wherein: wherein the instructions to manipulate at least one processor to determine the first threshold comprise instructions to manipulate at least one processor to determine the first threshold based on a weighted sum of the first and second statistical features for the sums of variance metrics of the set of one or more pictures; and wherein the instructions to manipulate at least one processor to determine the second threshold comprise instructions to manipulate at least one processor to determine the second threshold based on a weighted sum of the first and second statistical features for the estimated picture encoding cost metrics of the set of one or more pictures.

* * * * *